US010831052B2

(12) United States Patent
Lin et al.

(10) Patent No.: US 10,831,052 B2
(45) Date of Patent: Nov. 10, 2020

(54) DISPLAY DEVICE WITH VISUALLY-DISTINGUISHABLE WATERMARK AREA AND NON-WATERMARK AREA

(71) Applicant: E Ink California, LLC., Fremont, CA (US)

(72) Inventors: Craig Lin, Oakland, CA (US); Bryan Hans Chan, San Francisco, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 1 day.

(21) Appl. No.: 16/518,024

(22) Filed: Jul. 22, 2019

(65) Prior Publication Data

US 2019/0339563 A1 Nov. 7, 2019

Related U.S. Application Data

(63) Continuation of application No. 15/292,357, filed on Oct. 13, 2016, now Pat. No. 10,401,668, which is a (Continued)

(51) Int. Cl.
*G02F 1/1333* (2006.01)
*G02F 1/1335* (2006.01)
(Continued)

(52) U.S. Cl.
CPC .... *G02F 1/133377* (2013.01); *G02F 1/13394* (2013.01); *G02F 1/167* (2013.01);
(Continued)

(58) Field of Classification Search
CPC ........ G02F 1/167; G02F 1/133; G02F 1/1333; G02F 1/133377; G02F 1/1339;
(Continued)

(56) References Cited

U.S. PATENT DOCUMENTS 6,672,921 B1 1/2004 Liang
6,751,007 B2 6/2004 Liang
(Continued)

FOREIGN PATENT DOCUMENTS

JP 2007309960 A 11/2007
JP 2009098469 A 5/2009
(Continued)

OTHER PUBLICATIONS

Liang, R.C., "BreakThrough-Newly-Developed Color Electronic Paper Promises—Unbeatable Production Efficiency", Nikkei Microdevices, p. 3 (Dec. 2002). (in Japanese, with English translation). Dec. 1, 2002.
(Continued)

*Primary Examiner* — Thoi V Duong
(74) *Attorney, Agent, or Firm* — David J. Cole

(57) ABSTRACT

The present invention is directed to display devices comprising a watermark area and a non-watermark area. The display cells in the watermark area have widths of the partition walls, heights of the partition walls, top opening shapes or display cell sizes which are different from those of the display cells in the non-watermark area. The watermark aims to protect against counterfeiting or to be used for decoration purposes. The watermark is visible at certain viewing angles and/or under certain lighting conditions and it does not interfere with displaying of the regular images.

16 Claims, 14 Drawing Sheets

Viewing Side

Related U.S. Application Data continuation-in-part of application No. 13/896,232, filed on May 16, 2013, now Pat. No. 9,470,917.

(60) Provisional application No. 61/660,372, filed on Jun. 15, 2012, provisional application No. 61/653,210, filed on May 30, 2012.

(51) Int. Cl.
*G02F 1/1339* (2006.01)
*G02F 1/167* (2019.01)
*G02F 1/1681* (2019.01)

(52) U.S. Cl.
CPC ...... *G02F 1/1333* (2013.01); *G02F 1/133514* (2013.01); *G02F 1/1681* (2019.01); *G02F 2001/133374* (2013.01)

(58) Field of Classification Search
CPC ........... G02F 1/13394; G02F 1/133514; G02F 1/1343; G02F 1/15; G02F 1/155; G02F 1/1681; G02F 2001/133374
See application file for complete search history.

(56) References Cited

U.S. PATENT DOCUMENTS

| | | |
|---|---|---|
| 6,753,067 B2 | 6/2004 | Chen |
| 6,781,745 B2 | 8/2004 | Chung |
| 6,788,452 B2 | 9/2004 | Liang |
| 6,795,138 B2 | 9/2004 | Liang |
| 6,795,229 B2 | 9/2004 | Liang |
| 6,806,995 B2 | 10/2004 | Chung |
| 6,829,078 B2 | 12/2004 | Liang |
| 6,833,177 B2 | 12/2004 | Chen |
| 6,850,355 B2 | 2/2005 | Liang |
| 6,859,302 B2 | 2/2005 | Liang |
| 6,865,012 B2 | 3/2005 | Liang |
| 6,870,662 B2 | 3/2005 | Tseng |
| 6,885,495 B2 | 4/2005 | Liang |
| 6,906,779 B2 | 6/2005 | Chan-Park |
| 6,930,818 B1 | 8/2005 | Liang |
| 6,933,098 B2 | 8/2005 | Chan-Park |
| 6,947,202 B2 | 9/2005 | Liang |
| 6,987,605 B2 | 1/2006 | Liang |
| 7,046,228 B2 | 5/2006 | Liang |
| 7,072,095 B2 | 7/2006 | Liang |
| 7,079,303 B2 | 7/2006 | Hou |
| 7,141,279 B2 | 11/2006 | Liang |
| 7,156,945 B2 | 1/2007 | Chaug |
| 7,205,355 B2 | 4/2007 | Liang |
| 7,206,119 B2 | 4/2007 | Honeyman et al. |
| 7,233,429 B2 | 6/2007 | Liang |
| 7,261,920 B2 | 8/2007 | Haubrich |
| 7,271,947 B2 | 9/2007 | Liang |
| 7,304,780 B2 | 12/2007 | Liu |
| 7,307,778 B2 | 12/2007 | Wang |
| 7,327,346 B2 | 2/2008 | Chung |
| 7,347,957 B2 | 3/2008 | Wu |
| 7,470,386 B2 | 12/2008 | Kang |
| 7,504,050 B2 | 3/2009 | Weng |
| 7,572,491 B2 | 8/2009 | Wang |
| 7,580,180 B2 | 8/2009 | Ho |
| 7,679,826 B2 | 3/2010 | Ezra |
| 7,715,087 B2 | 5/2010 | Hou |
| 7,767,126 B2 | 8/2010 | Kang |
| 7,830,592 B1 | 11/2010 | Sprague |
| 7,880,958 B2 | 2/2011 | Zang |
| 8,002,948 B2 | 8/2011 | Haubrich |
| 8,154,790 B2 | 4/2012 | Wang |
| 8,169,690 B2 | 5/2012 | Lin |
| 8,237,892 B1 | 8/2012 | Sprague |
| 8,441,432 B2 | 5/2013 | Zang |
| 8,553,400 B2 | 10/2013 | Moran |
| 8,582,197 B2 | 11/2013 | Liang |
| 8,681,414 B2 | 3/2014 | Shin |
| 8,693,086 B2 | 4/2014 | Verschueren |
| 8,850,689 B2 | 10/2014 | Chen |
| 8,891,156 B2 | 11/2014 | Yang |
| 9,279,906 B2 | 3/2016 | Kang |
| 9,291,872 B1 | 3/2016 | Lin |
| 9,388,307 B2 | 7/2016 | Li |
| 9,436,057 B2 | 9/2016 | Kang |
| 9,436,058 B2 | 9/2016 | Li |
| 9,470,917 B2 | 10/2016 | Lin |
| 9,919,553 B2 | 3/2018 | Kang et al. |
| 2003/0035199 A1* | 2/2003 | Liang .................. G02F 1/1679 359/296 |
| 2003/0175480 A1 | 9/2003 | Chen |
| 2003/0175481 A1 | 9/2003 | Chen |
| 2003/0179437 A1 | 9/2003 | Liang |
| 2003/0203101 A1 | 10/2003 | Haubrich |
| 2014/0050814 A1 | 2/2014 | Kang |
| 2016/0059442 A1 | 3/2016 | Kang et al. |

FOREIGN PATENT DOCUMENTS

| | | |
|---|---|---|
| KR | 20050087553 A | 8/2005 |
| KR | 20100042444 A | 4/2010 |
| WO | 2011077668 A1 | 6/2011 |

OTHER PUBLICATIONS

Liang, R.C. et al., "Microcup Electrophoretic Displays by Roll-to-Roll Manufacturing Processes", IDW '02, Paper EP2-2, pp. 1337-1340, (Dec. 2002). Dec. 4, 2002.

Liang, R.C., "Microcup Electrophoretic and Liquid Crystal Displays by Roll-to-Roll Manufacturing Processes", Presented at Flexible Microelectronics & Displays Conference of U.S. Display Consortium, Phoenix, Arizona, USA (Feb. 2003). Feb. 3, 2003.

Liang, R.C. et al., "Microcup LCD, A New Type of Dispersed LCD by a Roll-to-Roll Manufacturing Process", Presented at IDMC, Paper We-02-04, pp. 1-4, Taipei, Taiwan, (Feb. 2003). Feb. 18, 2003.

Liang, R.C. et al., "Passive Matrix Microcup Electrophoretic Displays", IDMC'03, Paper FR-17-5, p. 1-4, Taipei, Taiwan, (Feb. 2003). Feb. 18, 2003.

Liang, R.C. et al., "Microcup Displays: Electronic Paper by Roll-to-Roll Manufacturing Processes" Journal of the SID, 11 (4), pp. 621-628, (Feb. 2003). Feb. 18, 2003.

Chen, S.M., "Revolution electronic paper: The New Application and the Dynamics of Companies", Topology Research Institute, pp. 1-10, (May 2003). (In Chinese, English abstract attached) May 1, 2003.

Liang, R.C. et al., "Microcup Active and Passive Matrix Electrophoretic Displays by a Roll-to-Roll Manufacturing Processes", SID 03 Digest, Paper 201, pp. 838-841 (May 2003). May 21, 2003.

Lee, H. et al.' "SiPix Microcup Electronic Paper—An Introduction" Advanced Display, Issue 37, pp. 4-9, (Jun. 2003). (in Chinese, English abstract attached) Jun. 1, 2003.

Chen, S.M., "The Applications for the Revolutionary Electronic Paper Technology", OPTO News & Letters, Issue 102, pp. 37-41 (Jul. 2003). (in Chinese, English abstract attached) Jul. 1, 2003.

Zang, H.M. et al., "Microcup Electronic Paper by Roll-to-Roll Manufacturing Processes", The Spectrum, 16(2), pp. 16-21 (2003). Jul. 1, 2003.

Allen, Kimberly, Ph.D., "Electrophoretics Fulfilled. Emerging Displays Review: Emerging Display Technologies, Monthly Report", Stanford Resources Display Insight, pp. 9-14, (Oct. 2003). Oct. 1, 2003.

Kleper, M. et al., "An Investigation of the Emerging and Developing Technologies Related to the Generation Beyond Print-on-Paper", Advanced Display Technologies, Rochester Institute of Technology, pp. 13-15, (Oct. 2003). Oct. 1, 2003.

Zang, H.M. "Microcup Electronic Paper by Roll-to-Roll Manufacturing Processes", Presentation at the Advisory Board Meeting, Bowling Green State Univ., Ohio, USA (Oct. 2003). Oct. 23, 2003.

(56) References Cited

OTHER PUBLICATIONS

Chung, J. et al., "Microcup Electrophoretic Displays, Grayscale and Color Rendition", IDW, AMD2 & EP1-2, pp. 243-246 (Dec. 2003). Dec. 1, 2003.
Ho, C. et al., "Microcup Electronic Paper by Roll-to-Roll Manufacturing Processes", Presentation conducted at FEG, Nei-Li, Taiwan, (Dec. 2003). Dec. 23, 2003.
Zang, H.M. et al., "Threshold and Grayscale Stability of Microcup Electronic Paper", SPIE vol. 5289, pp. 102-108, (Jan. 2004). Jan. 19, 2004.
Zang, H.M., "Microcup Electronic Paper", Presentation at the Displays & Microelectronics Conference of U.S. Display consortium, Phoenix, Arizona, USA (Feb. 2004). Feb. 10, 2004.
Wang, X. et al., "Microcup Electronic Paper and the Converting Processes", ASID, 10.1.2-26, pp. 396-399, Nanjing, China, (Feb. 2004). Feb. 15, 2004.
Chaug, Y.S. et al., "Roll-to-Roll Processes for the Manufacturing of Patterned Conductive Electrodes on Flexible Substrates", Mat. Res. Soc. Symp. Proc., vol. 814, l9.6.1., (Apr. 2004). Apr. 12, 2004.
Liang, R.C., "Microcup Electronic Paper by Roll-to-Roll Manufacturing Process", Presented at the Flexible Displays & Electronics 2004 of Intertech, San Fransisco, California, USA, (Apr. 2004). Apr. 28, 2004.
Hou, J. et al., "Reliability and Performance of Flexible Electrophoretic Displays by Roll-to-Roll Manufacturing Processes", SID Digest, 32.3, pp. 1066-1069 (May 2004). May 27, 2004.
Wang, X. et al., "Microcup Electronic Paper and the Converting Processes", Advanced Display, Issue 43, pp. 48-51 (Jun. 2004). (in Chinese, with English abstract) Jun. 1, 2004.
Liang, R.C. et al., "Format Flexible Microcup Electronic Paper by Roll-to-Roll Manufacturing Process", Presented at 14th FPD Manufacturing Technology EXPO & Conference, Tokyo, Japan, (Jun. 30-Jul. 2, 2004). Jul. 2, 2004.
Liang R.C. "Flexible and Rollable Displays/Electronic Paper—A Technology Overview", Presented at the METS Conference, Taipei, Taiwan, (Oct. 2004). Oct. 22, 2004.
Bardsley, J.N. et al., "Microcup Electrophoretic Displays", USDC Flexible Display Report, 3.1.2., pp. 3-12 to 3-16, (Nov. 2004). Nov. 1, 2004.
Hi, Candice, "Microcup Electronic Paper Device and Application", Presentation conducted at USDC 4th Annual Flexible Display and Microelectronics Conference, Phoenix, Arizona, USA, (Feb. 1, 2005). Feb. 1, 2005.
Zang, H.M. et al., "Flexible Microcup EPD by RTR Process", Presentation conducted at 2nd Annual Paper-Like Displays Conference, St. Pete Beach, Florida, USA, (Feb. 9-11, 2005). Feb. 10, 2005.
Liang, R.C. "Flexible and Roll-able Displays/Electronic Paper—A Brief Technology Overview", Presentation at Flexible Display Forum, Taiwan (Feb. 2005). Feb. 17, 2005.
Wang, X. et al., "Inkjet Fabrication of Multi-Color Microcup Electrophorectic Display", 5th Flexible Microelectronics & Displays Conference of U.S. Display Consortium, Phoenix, AZ, USA, (Feb. 2006). Feb. 9, 2006.
Zang, H.M., et al., "Monochrome and Area Color Microcup EPDs by Roll-to-Roll Manufacturing Processes", ICIS 06 International Congress of Imaging Science Final Program and Proceedings, pp. 362-365, Rochester, New York, USA (May 2006). May 9, 2006.
Wang, X. et al., "Roll-to-Roll Manufacturing Process for Full Color Electrophoretic Film", SID 06 Digest, vol. 37, Issue 1, pp. 1587-1589, (Jun. 2006). Jun. 8, 2006.
Zang, H.M., "Monochrome and Area Color Microcup EPDs by Roll-to-Roll Manufacturing Process", Presentation conducted at the Fourth Organic Electronics Conference and Exhibition (OEC-06), Frankfurt, Germany, (Sep. 25-27, 2006). Sep. 26, 2006.
Ho, Andrew, "Embedding e-Paper in Smart Cards, Pricing Labels & Indicators", Presentation conducted at Smart Paper Conference, Atlanta, GA, USA (Nov. 15-16, 2006). Nov. 15, 2006.
Zang, H.M. "Developments in Microcup Flexible Displays", Presentation conducted at the 6th Annual Flexible Display and Microelectronics Conference, Phoenix, AZ, Feb. 6-8, 2007. Feb. 7, 2007.
Zang H.M. et al. "Microcup e-Paper for Embedded and Flexible Designs", IDMC'07, Taipei International Convention Center, Taiwan, (Jul. 2007). Jul. 6, 2007.
Sprague, R.A., "SiPix Microcup Electrophoretic Epaper for Ebooks", NIP 25, 2009, pp. 460-462; (Sep. 23, 2009). (Presentation conducted on Sep. 23, 2009 at the 25th Int'l Conference on Digital Printing Technologies, Louisville, Kentucky, USA.) Sep. 23, 2009.
International Search Report for the corresponding International Application WO 2013/180971, dated Aug. 27, 2013.
European Patent Office, EP Appl. No. 13797753.4, Extended European Search Report, dated Nov. 25, 2015. Nov. 25, 2015.

\* cited by examiner

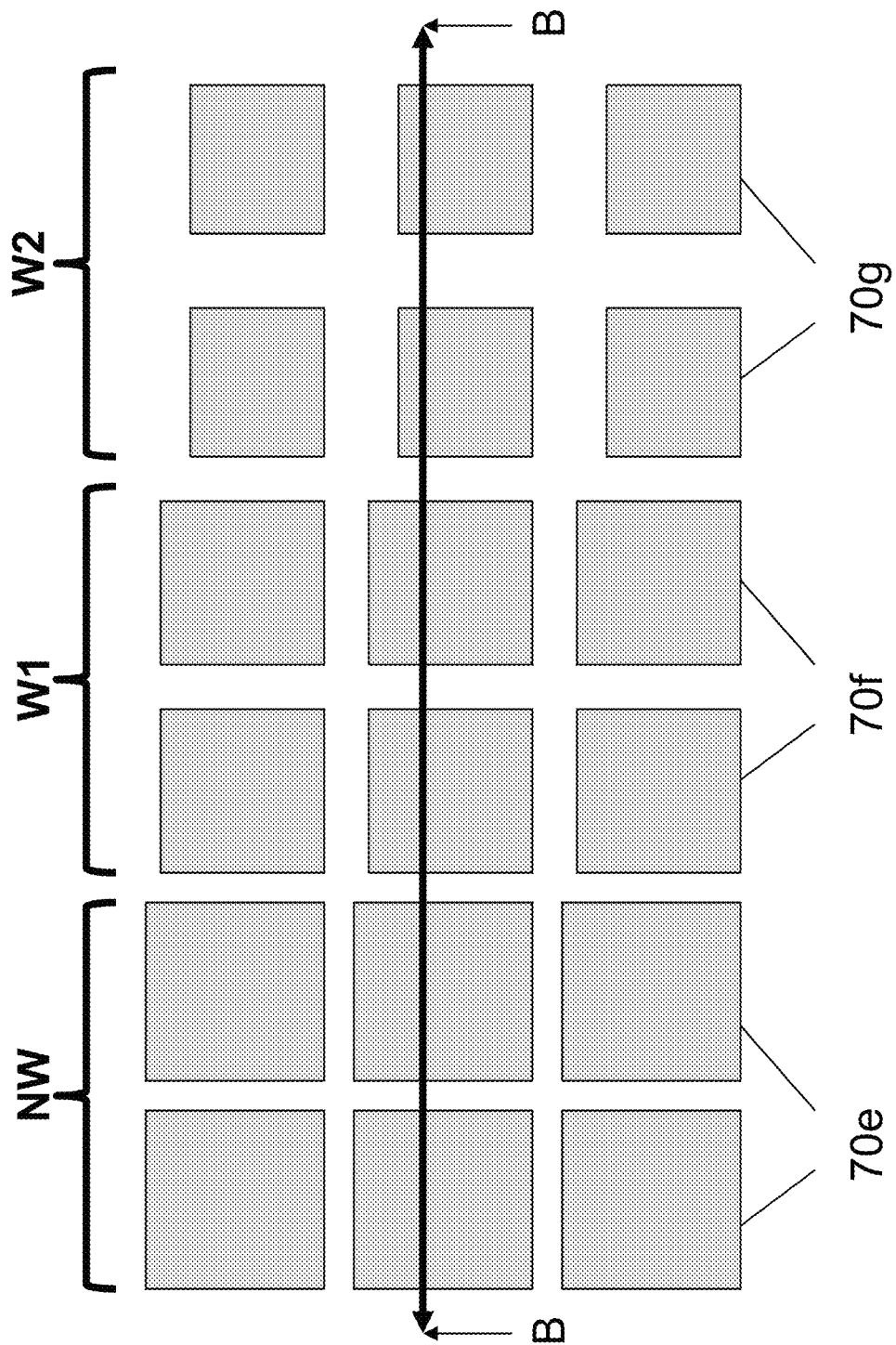

DISPLAY DEVICE WITH VISUALLY-DISTINGUISHABLE WATERMARK AREA AND NON-WATERMARK AREA

REFERENCE TO RELATED APPLICATIONS

This application is a continuation of copending application Ser. No. 15/292,357, filed Oct. 13, 2016 (Publication No. 2017/0031204), which is itself a continuation-in-part of application Ser. No. 13/896,232, filed May 16, 2013 (Publication No. 2013/0321744, now U.S. Pat. No. 9,470,917 issued Oct. 18, 2016), which claims priority to U.S. Provisional Applications Nos. 61/660,372, filed Jun. 15, 2012; and 61/653,210, filed May 30, 2012.

The entire contents of all U.S. patents and published and copending applications mentioned herein are herein incorporated by reference.

BACKGROUND OF INVENTION

The present invention is directed to a display device wherein the viewing side of the display device has a watermark area and a non-watermark area and the display cells in the watermark area are modulated to be distinguishable from the display cells in the non-watermark area. The display device comprising the watermark feature is useful for protecting against counterfeiting or decoration purposes.

U.S. Pat. Nos. 6,930,818 and 6,795,138 disclose image display devices based on the microcup technology. The patents describe the manufacture of microcups as display cells. The microcups are then filled with a display fluid. The top openings of the microcups may have the same size and shape and such microcups spread across the entire display surface.

SUMMARY OF INVENTION

The first aspect of the present invention is directed to a display device comprising display cells wherein the viewing side of the display device has a watermark area and a non-watermark area and the display cells in the watermark area are modulated to be distinguishable from the display cells in the non-watermark area.

In one embodiment, the walls of the display cells in the watermark area have a different width than the walls of the display cells in the non-watermark area.

In one embodiment, the walls of the display cells in the watermark area are thicker than the walls of the display cells in the non-watermark area.

In one embodiment, the walls of the display cells in the watermark area are thinner than the walls of the display cells in the non-watermark area.

In one embodiment, the walls of the display cells in the watermark area are at least about 5% thicker or thinner than those in the non-watermark area.

In one embodiment, the walls of the display cells in the watermark area have different thickness.

In one embodiment, the wall of at least one side of a display cell in the watermark area has varying thickness.

In one embodiment, the walls of the display cells in the watermark area have a different height than the walls of the display cells in the non-watermark area.

In one embodiment, the display cells in the watermark area have a different shape than the display cells in the non-watermark area.

In one embodiment, the display cells in the watermark area have more than one type of shape.

In one embodiment, the display cells in the watermarks area have a different size from the cells in the non-watermark area. For example, the cells in the watermark area may be at least twice as large (in both lateral dimensions) as the cells in the non-watermark area. Alternatively, the cells in the watermark area may be not more than one half the size of the cells in the non-watermark area.

In one embodiment, the display device is a reflective type of display device.

In one embodiment, the display device is a transmissive type of display device.

In one embodiment, the display device is a transreflective type of display device.

In one embodiment, the display device is an electrophoretic display.

In one embodiment, the display device is a liquid crystal display.

In one embodiment, the display device further comprises a color layer on the non-viewing side of the display device. The color layer may be a sealing layer, an adhesive layer or an electrode layer.

Another aspect of the present invention is directed to a display device comprising display cells separated by partition walls wherein at least one parameter of the display cells in the watermark area is modulated with at least two variations which are different from that parameter in the non-watermark area. In one embodiment, the parameter is the partition wall height. In another embodiment, the parameter is the partition wall width. In a further embodiment, the parameter is the shape of the display cells.

BRIEF DESCRIPTION OF DRAWINGS

FIG. 12A is a top plan view, similar to that of FIG. 11A, of a display panel having non-watermark and first and second watermark areas in which the height and width of the partition walls differ between the non-watermark area and the first watermark area, and between the first and second watermark areas.

DETAILED DESCRIPTION

The present inventors have now found that a watermark feature may be added to a display device, which watermark is useful to protect against counterfeiting when a security measure is required for the display device. In addition, the watermark may also be used for ornamental design/decoration purposes.

The watermark feature may be achieved by modulating (i.e., altering) at least one parameter of the display cells, in the watermark area.

Figure 1:
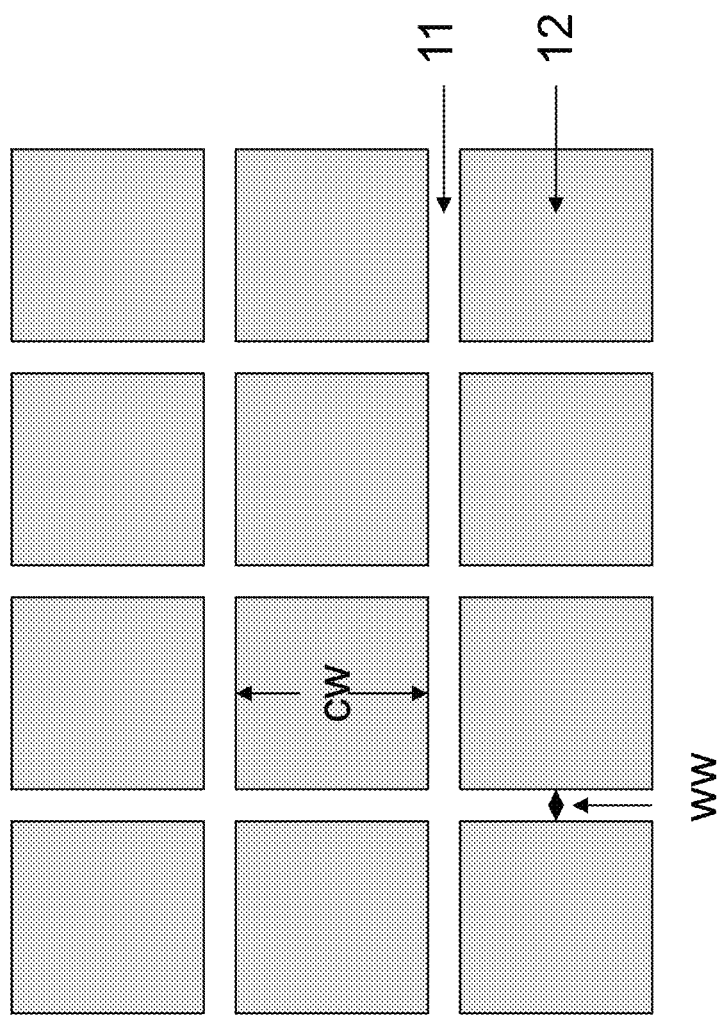
FIGS. 1 and 2 depict top view of display devices.
Figure 2:
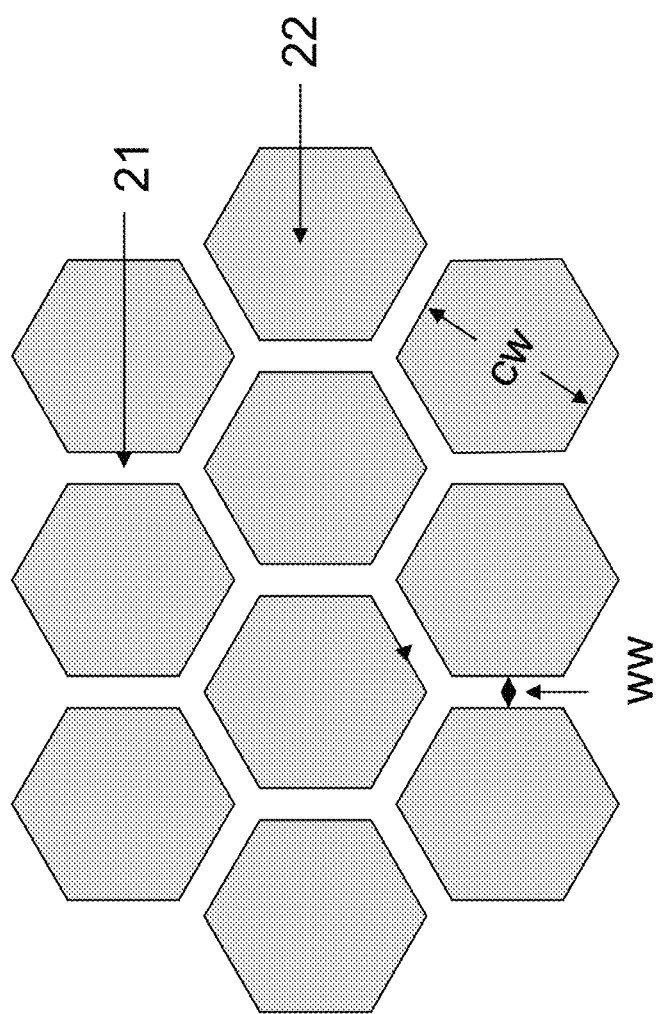

FIGS. 1 and 2 depict top views of a display device. In the two examples, the display cells have a square or hexagonal top opening, respectively. The entire surface of the display device may be divided into the display cell area (shaded) and the partition wall area (11 and 21). The display cell area comprises a plurality of display cells (12 and 22) which are micro-containers filled with a display element, such as a display fluid.

Each individual display cell usually has a cell width (cw) smaller than 300 μm. The cell width, in the context of this application, is defined as the distance between two opposing parallel sides of a display cell.

Because of their small size and uniform shape, the individual display cells are barely perceivable by naked eyes. Therefore such a display device can display images without the grid-like feel.

The wall width (ww) of the partition walls is usually in the range of about 5 to about 30 μm. When referring to partition walls in this application, "width" and "thickness" and "wider" and "thicker" are used interchangeably.

Therefore, display devices prepared by the microcup technology (as described in U.S. Pat. Nos. 6,930,818 and 6,795,138) are most suitable for the present invention because the microcup-based display cells are sufficiently small and they may be formed to have a uniform size and shape. However, the scope of the invention may also extend to any display device as long as it has display cells which are sufficiently small and have well-defined sizes and shapes that may be pre-determined before manufacture.

The microcup-based display cells may be manufactured by any of the processes (such as microembossing) described in the US patents identified above. Briefly the modulated parameter(s) may be built-in in the male mold to be used for forming the microcup-based display cells in an embossing process.

The display element filled in the display cells may be an electrophoretic fluid comprising charged pigment particles dispersed in a solvent or solvent mixture. An electrophoretic display typically comprises two plates with electrodes placed opposing each other. When a voltage difference is imposed between the two electrodes, the pigment particles in the display fluid migrate to one side or the other causing either the color of the pigment particles or the color of the solvent being seen from the viewing side.

Alternatively, an electrophoretic fluid may comprise two types of charged pigment particles of contrasting colors and carrying opposite charges, and the two types of the charged pigment particles are dispersed in a clear solvent or solvent mixture. In this case, when a voltage difference is imposed between the two electrode plates, the two types of the charged pigment particles would move to opposite ends (top or bottom) in a display cell. Thus one of the colors of the two types of the charged pigment particles would be seen at the viewing side of the display cell.

While electrophoretic display is specifically mentioned, it is understood that the present application is applicable to other types of display device as well, such as other types of reflective display device or transmissive and transreflective display devices, including liquid crystal display devices.

The watermark created according to the present invention is visible at certain viewing angles and/or under certain lighting conditions. The watermark would not interfere with the desired regular images displayed (based on movement of charged pigment particles in a solvent or solvent mixture in an electrophoretic display, for example).

Figure 3:
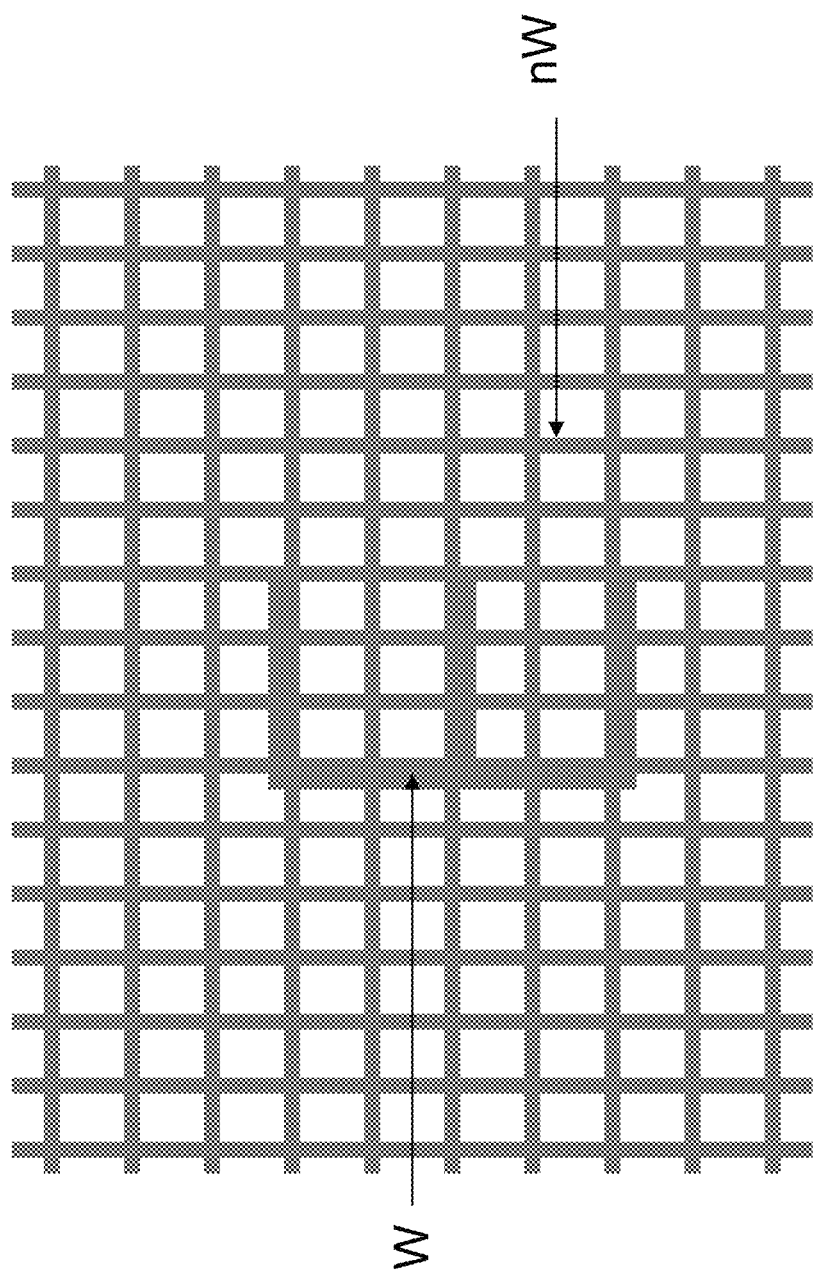
FIG. 3 shows a watermark area in which the walls of the display cells are thicker or wider than those in the non-watermark area.

In one embodiment of the present invention, the width of the partition walls of the display cells is modulated. As shown in FIG. 3, the display device has a watermark area (W) and a non-watermark area (nW). In the watermark area (alphabet "E"), the partition walls of the display cells are wider or thicker than those in the non-watermark area.

In another embodiment, the partition walls in the watermark area may be thinner than those in the non-watermark area.

In general, the width of the partition walls in the watermark area may be at least about 5% thicker or thinner than those in the non-watermark area. It is noted that the wall thickness in some of the drawings is exaggerated for clarity.

Figure 4:
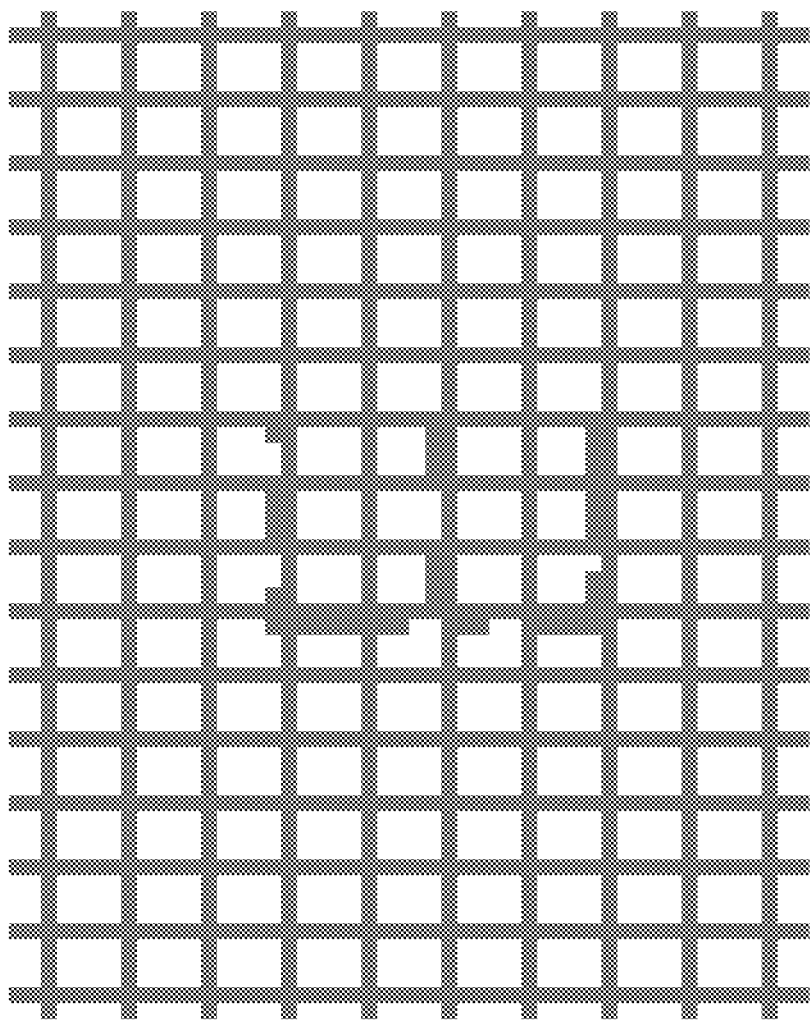
FIG. 4 shows the wall thickness in the watermark area may vary.

In another embodiment as shown in FIG. 4, the thickness of the partition walls in the watermark area may vary. In this case, the differences in the wall width can generate different levels of color intensity to display a grey-scale-like image for the watermark.

Figure 5:
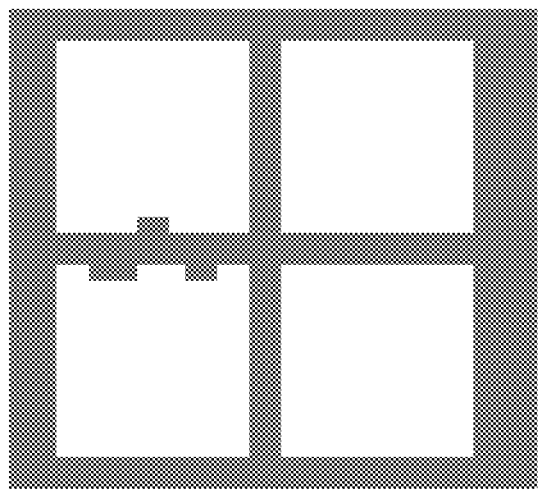
FIG. 5 shows the thickness of the wall on at least one side of a display cell may vary.

In a further embodiment as shown in FIG. 5, the wall thickness may vary within the partition wall on at least one side of a display cell. By varying the wall thickness on at least one side of a display cell, it may create a different optical effect in the watermark area to cause it to be distinguished from the non-watermark area.

Figure 6:
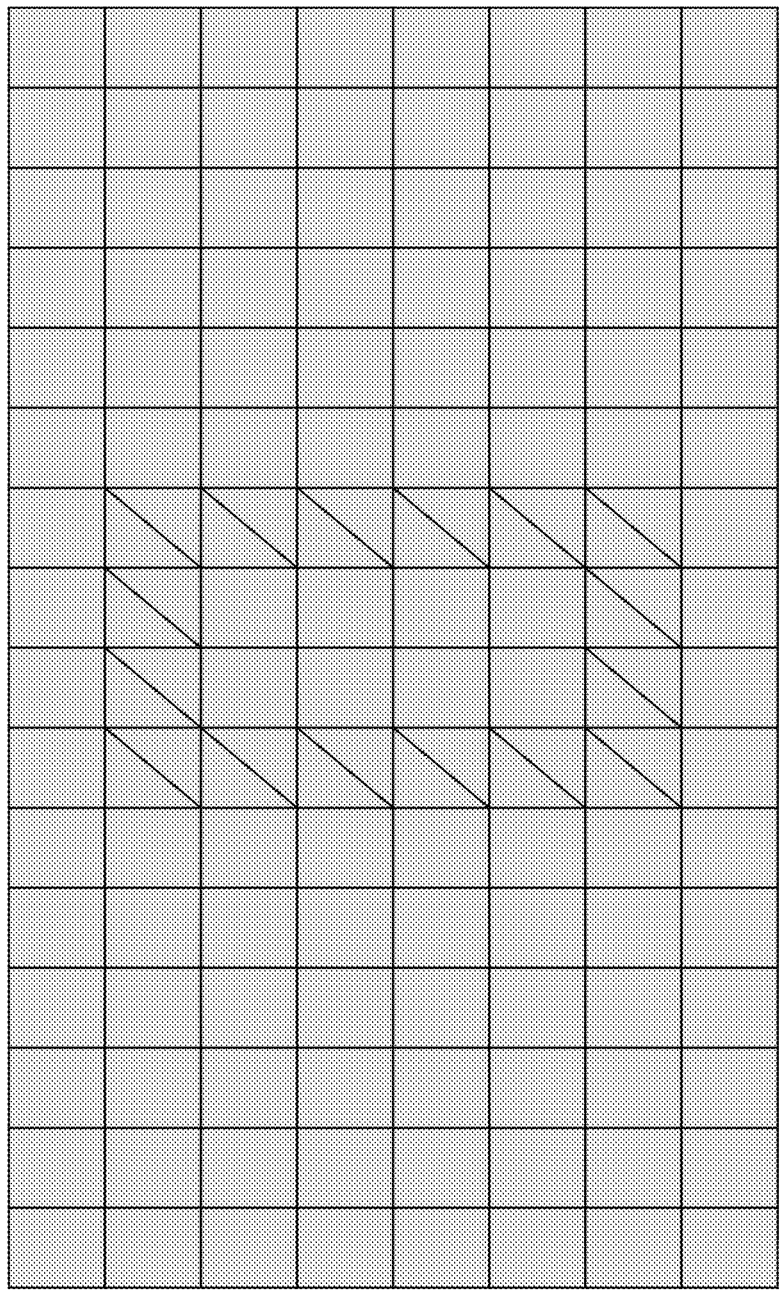
FIG. 6 shows a watermark area in which the shape of the display cells is different from that in the non-watermark area.

In yet a further embodiment, the shape of the display cells may be a modulating parameter. In an example as shown in FIG. 6, the display cells in the watermark area (alphabet "O") have a different shape (i.e., triangle) than those in the non-watermark area (i.e., square). The shapes in the watermark area or the non-watermark area are not limited to triangle or square. They may be any regular shapes or irregular shapes as long as the shape of the display cells in the watermark area is different from that in the non-watermark area. It is also possible that not all of the display cells in the watermark area have the same shape. The term "shape", in this embodiment of the invention, refers to the shape of the top opening of the display cells.

In yet a further embodiment (not illustrated in the drawings), the size of the display cells may be a modulating parameter. For example, in a modification of the display shown in FIG. 6, instead of the display cells in the watermark area being (notionally) obtained from the cells in the non-watermark area by dividing each rectangular cell diagonally to produce two triangular cells, each cell may be divided by walls parallel to its original walls to divide each cell into a 2×2, 3×3 . . . etc. array of cells which share the shape of the cells in the non-watermark area but are smaller in both lateral dimensions. Alternatively, the cells in the watermark area may be made larger than those in the non-watermark area by removing partition walls between cells in the watermark area, thus combining four, nine etc. cells in the watermark area into a single cell two or three etc. times as large in both lateral dimensions as the cells in the non-watermark area.

The different shapes of the display cells in the watermark area may be achieved by a number of methods. Certain methods are described in U.S. patent application Ser. No. 13/765,588, the content of which is incorporated herein by reference in its entirety. Briefly, the design of the different shape of the display cells (e.g., microcups) in the watermark area may be achieved by removing partition walls of non-altered display cells and replacing the removed partition walls with new partition walls. Alternatively, the design of the different shape of the display cells (e.g., microcups) in the watermark area may be achieved by independently shifting apex points of non-altered display cells within a defined area, and reconnecting the shifted apex points. Utilizing these design methods, the display cells in the watermark area may have different shapes (i.e., randomized).

In yet a further embodiment, the height of the partition walls of the display cells may be a modulating parameter for the watermark area.

The watermark is not limited to characters, numbers or geometric shapes. It may also be complex images such as pictures with grey levels.

As stated above, the watermark may only be visible in a display device at certain angles or under strong lighting conditions; and it usually will not be seen in the normal display mode so that the quality of the regular images displayed is not affected.

Figure 7:
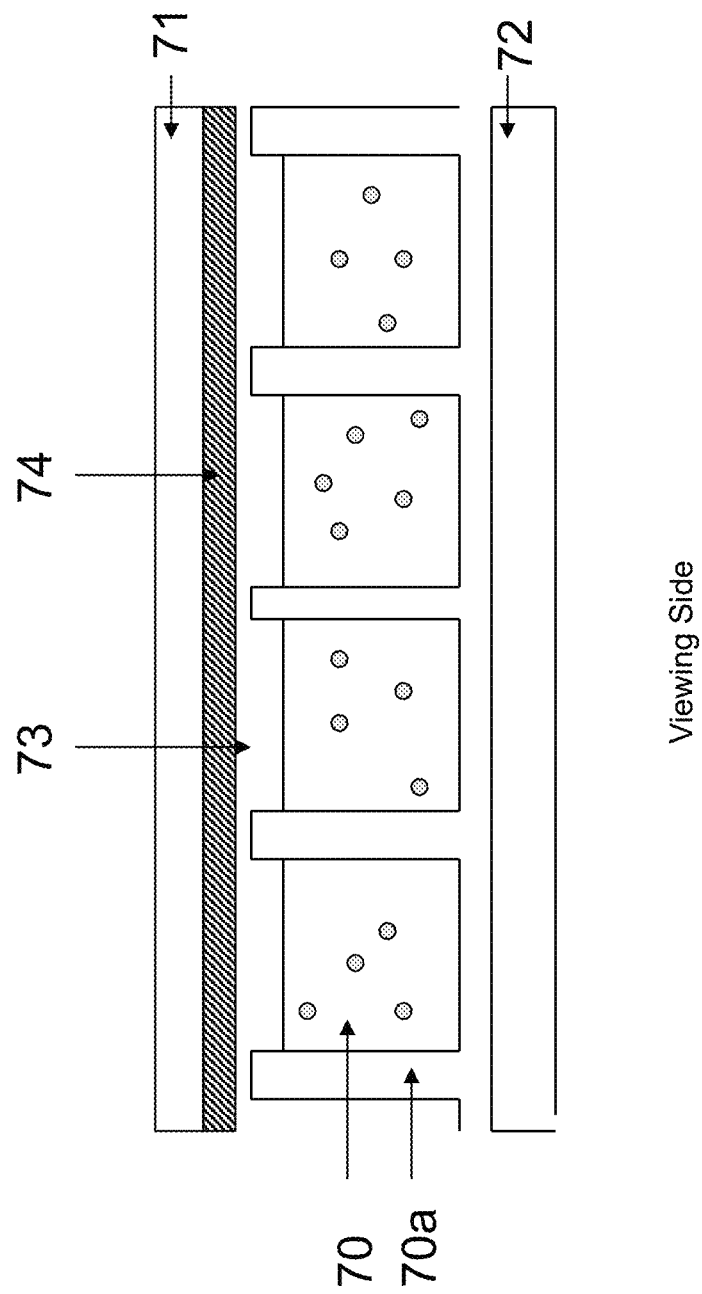
FIG. 7 shows a cross-sectional view of a display panel.

FIG. 7 shows a cross-sectional view of a display panel. A plurality of display cells (70) filled with a display fluid, are sandwiched between two electrode layers (71 and 72). As discussed above, the width of the display cell walls (70a) may be modulated to form a watermark. In the case of microcup-based display cells, the filled microcups are sealed with a sealing layer (73). The electrode layer (71) is laminated over the filled and sealed microcups, optionally with an adhesive layer (74). This display panel is viewed from the side of the electrode layer (72).

In one embodiment of the present invention, a color layer may be added to enhance the viewing of the watermark. The color layer is on the side opposite of the viewing side. In other words, the color layer is on the non-viewing side.

When a color layer is present, the watermark can be better seen even when the image is at the full black or white color state.

The color layer may be achieved by making the sealing layer (73), the adhesive layer (74) or the electrode layer (71) colored. For example, a pigment or dye material may be added to a sealing composition or adhesive composition to cause the sealing or adhesive layer to be colored. The electrode layer may be colored (e.g., a metallic shade).

Figure 9:
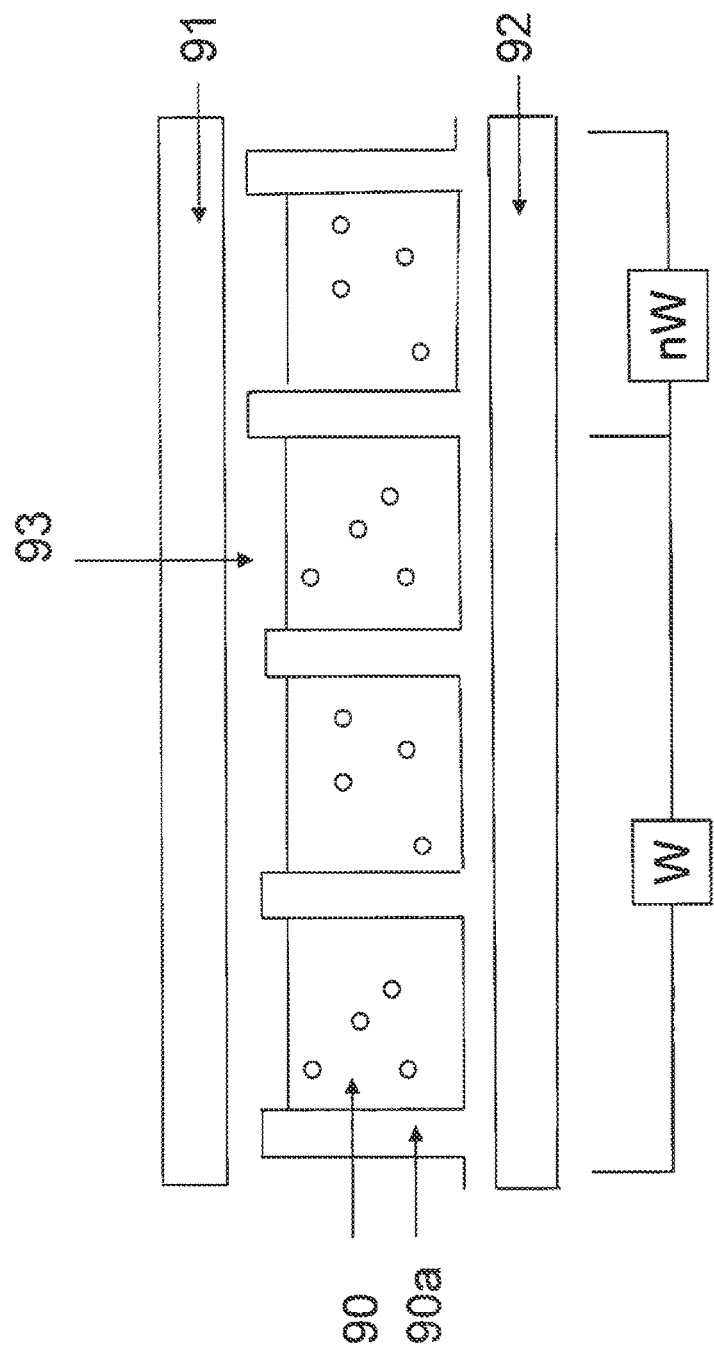
FIG. 9 shows a cross-sectional view of a display panel, which has different heights of partition walls 90a in watermark area (W) and non-watermark area (nW).
Figure 10:
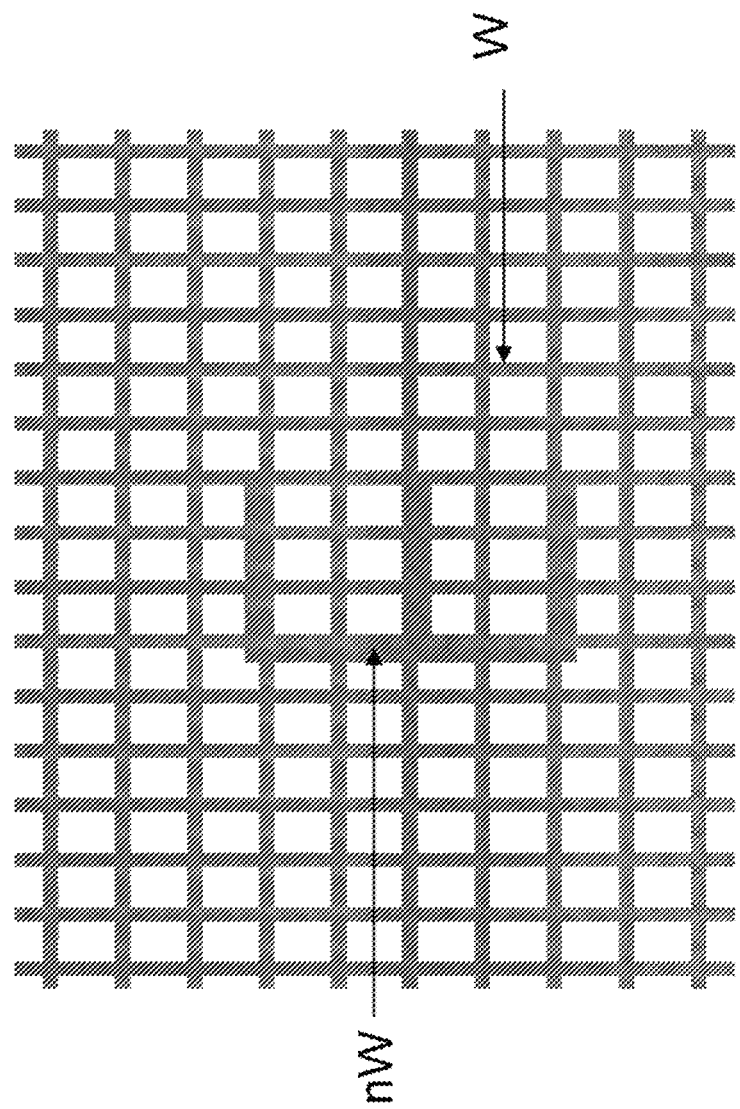
FIG. 10 shows a watermark area in which the walls of the display cells are thinner than those in the non-watermark area.

FIG. 9 shows a cross-sectional view of a display panel. A plurality of display cells (90) filled with a display fluid are sandwiched between two electrode layers (91 and 92). The filled display cells are sealed with a sealing layer (93). In one embodiment, the sealing layer is a color layer. The heights of partition walls (90a) in a watermark (W) are different from those in the non-watermark area (nW).

In another aspect, each modulating parameter, according to the present invention, may have one or more variations in the watermark area from the non-watermark area. For example, the wall widths of the display cells may be modulated and the display cells in the watermark area may have one or more wall widths which are different from that in the non-watermark area. In another example, the wall heights of the display cells may be modulated and the display cells in the watermark area may have one or more wall heights which are different from that in the non-watermark area. In another example, the shapes of the display cells may be modulated and in this case, the display cells in the watermark area may have one or more shapes which are different from that in the non-watermark area.

Figure 8:
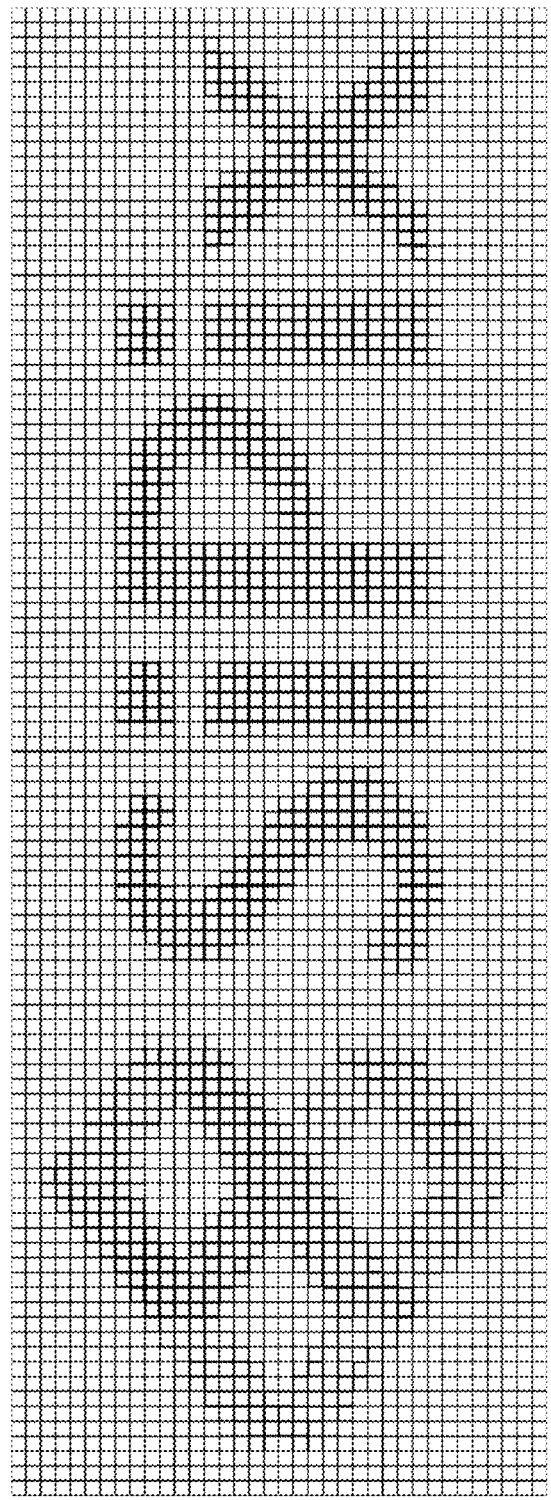
FIG. 8 shows a watermark having different color intensities.

When there are two or more variations for a modulating parameter in the watermark area, the watermark may show different color intensities. As shown in FIG. 8, there are different color intensities in the watermark area (i.e., a logo and the word "SiPix") because there are more than one wall widths which are different from that in the non-watermark area.

Figure 11A:
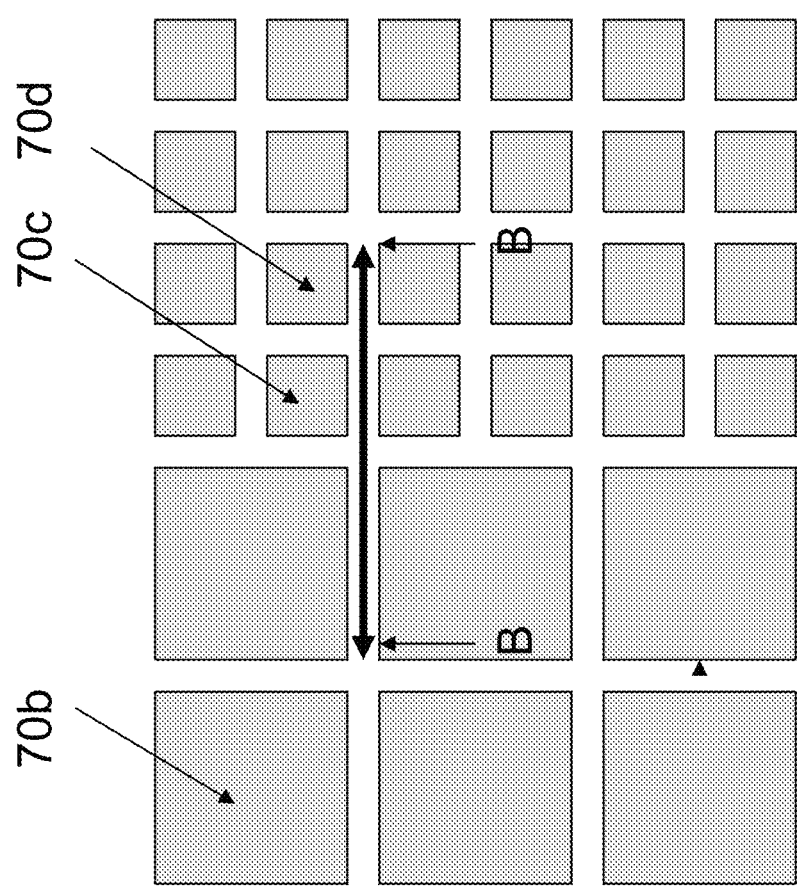
FIG. 11A is a top plan view, similar to that of FIG. 6, of a display panel in which the size of the display cells differs between the watermark and non-watermark areas.
Figure 11B:
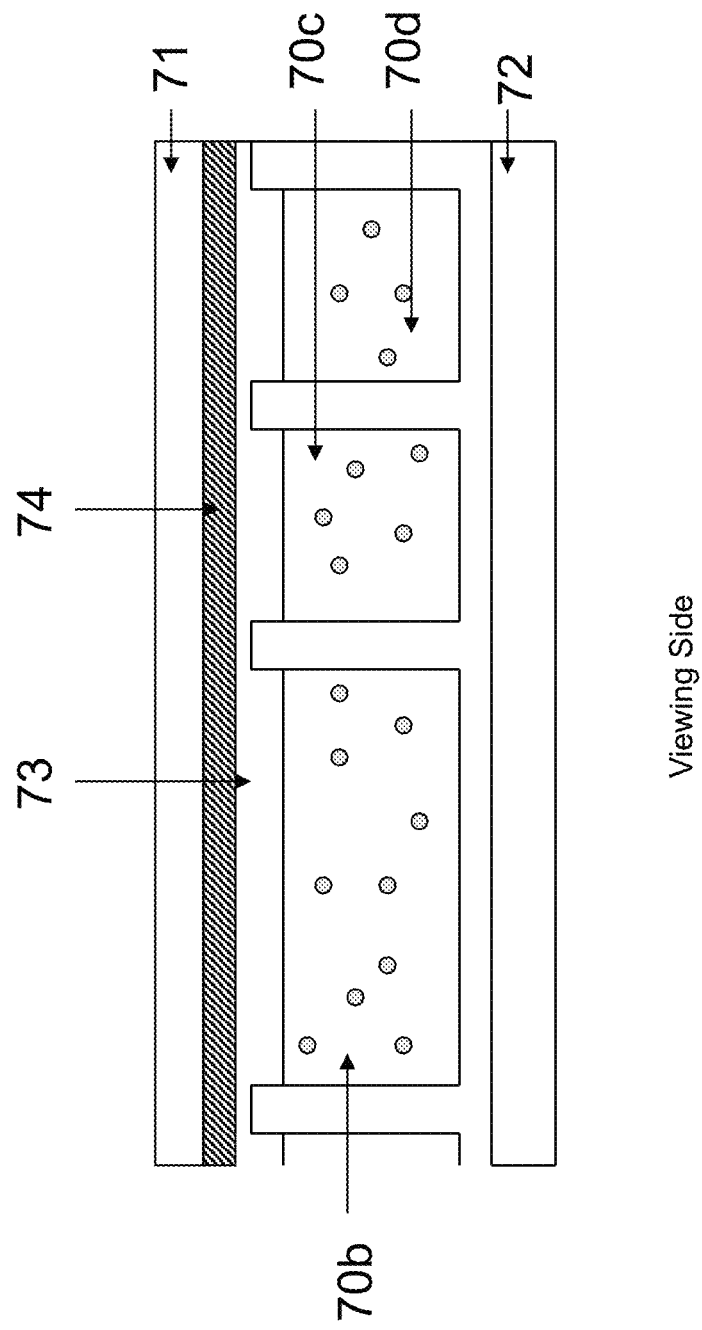
FIG. 11B is a section along line B-B in FIG. 11A looking in the direction of the arrows.

FIG. 11A is a top plan view, similar to that of FIG. 6, of a display panel in which the size of the display cells differs between the watermark and non-watermark areas, with FIG. 11B being a partial section through the display panel. As is conventional, the display panel shown in FIGS. 11A and 11B is planar. As may readily be seen from FIGS. 11A and 11B, each cell 70b in the non-watermark area has each lateral dimension in the plane of the display panel approximately twice as large as that of each of the cells 70c and 70d. Thus, as illustrated the cells in the non-watermark area are twice as large in both lateral dimensions as the cells in the watermark area. Alternatively, of course, cell 70b could form part of the watermark area, while cells 70c and 70d could form part of the non-watermark area, so that in this case the cells in the non-watermark area would be approximately one-half as large in both lateral dimensions as the cells in the watermark area.

Figure 12B:
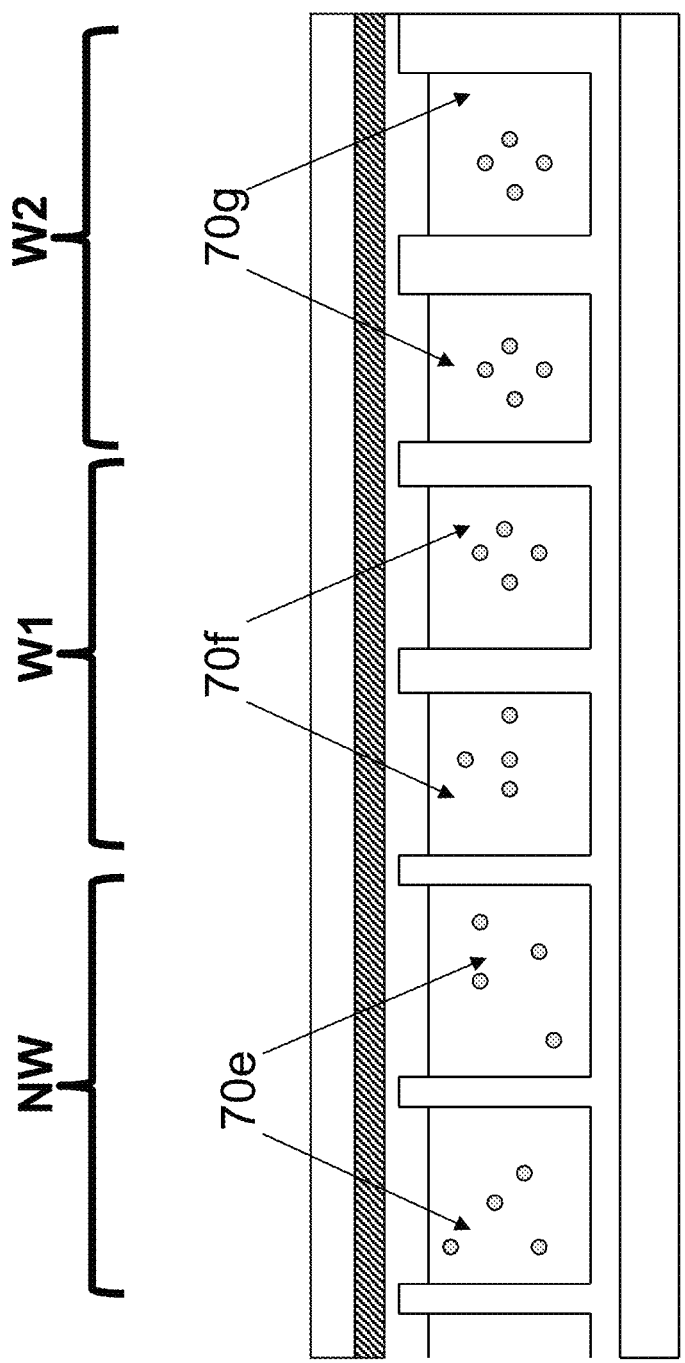
FIG. 12B is a section along line B-B in FIG. 12A looking in the direction of the arrows.

FIG. 12A is a top plan view, similar to that of FIG. 11A, of a display panel having non-watermark and first and second watermark areas in which the height and width of the partition walls differ between the non-watermark area and the first watermark area, and between the first and second watermark areas, with FIG. 12B being a partial section through the display panel. The display panel shown in FIGS. 12A and 12B has a non-watermark area N, a first watermark area W1 and a second watermark area W2. FIG. 12B illustrates a section through two cells 70e in the non-watermark area N, two cells 70f in the first watermark area W1 and two cells, 70g in the second watermark area W2. Although the overall size of the cells (including the partition walls) in the three areas is the same, the thicknesses of the partition walls in the non-watermark area is less than the thicknesses of the partition walls in the first watermark area W1, which in turn is less than the thicknesses of the partition walls in the second watermark area W2

As discussed above with reference to FIG. 7, a color layer may be added to enhance the viewing of the watermark, this color layer being provided on the non-viewing side of the display. The color layer may be provided by adding a dye or pigment to the sealing layer, adhesive layer or (non-viewing) electrode layer present in the panels of FIGS. 11A, 11B, 12A and 12B.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective and scope of the present invention. All such modifications are intended to be within the scope of the claims appended hereto.

The invention claimed:

1. A display device comprising a layer of display cells filled with a display fluid, the display device further comprising partition walls for separating the display cells, and wherein the display device has a watermark area and a non-watermark area, and each of the display cells in the watermark area has a first size, from each of the display cells in the non-watermark area has a second size, and the first size differs from the second size, the display having a viewing surface and a colored layer on the opposed side of the layer of display cells from the viewing surface.

2. The display device of claim 1, which is an electrophoretic display.

3. The display device of claim 1, which is a liquid crystal display.

4. A display device comprising display cells separated by partition walls, the display device having a first watermark area, a second watermark area and a non-watermark area, and wherein for at least one parameter selected from partition wall height, partition wall width and the shape of each display cell, the parameter has a first value in the non-watermark area, a second value in the first watermark area and a third value in the second watermark area, and the first, second and third values are all different from each other, the display having a viewing surface and a colored layer on the opposed side of the layer of display cells from the viewing surface.

5. The display device of claim 4, which is an electrophoretic display.

6. The display device of claim 4, which is a liquid crystal display.

7. A display device comprising display cells separated by partition walls, the display device having a watermark area and a non-watermark area, and wherein for at least one parameter selected from partition wall height, partition wall width and the shape of each display cell, the parameter has a first value in the non-watermark area, a second value in the watermark area, and the first and second values are different from each other, the display having a viewing surface and a colored layer on the opposed side of the layer of display cells from the viewing surface.

8. The display device of claim 7, wherein the at least one parameter comprises the partition wall height.

9. The display device of claim 7, wherein the at least one parameter comprises the partition wall width.

10. The display device of claim 7, wherein the at least one parameter comprises the shape of the display cells.

11. The display device of claim 7, wherein the colored layer is a sealing layer.

12. The display device of claim 7, wherein the colored layer is an adhesive layer.

13. The display device of claim 7, wherein the colored layer is an electrode layer.

14. The display device of claim 7 wherein said opposed side is provided with a sealing layer which seals the display cells, an adhesive layer on the opposed side of the sealing layer from the display cells, and an electrode layer on the opposed side of the adhesive layer from the display cells, and the colored layer is formed in one of the sealing, adhesive and electrode layers.

15. The display device of claim 7, which is an electrophoretic display.

16. The display device of claim 7, which is a liquid crystal display.

* * * * *